UNITED STATES PATENT OFFICE.

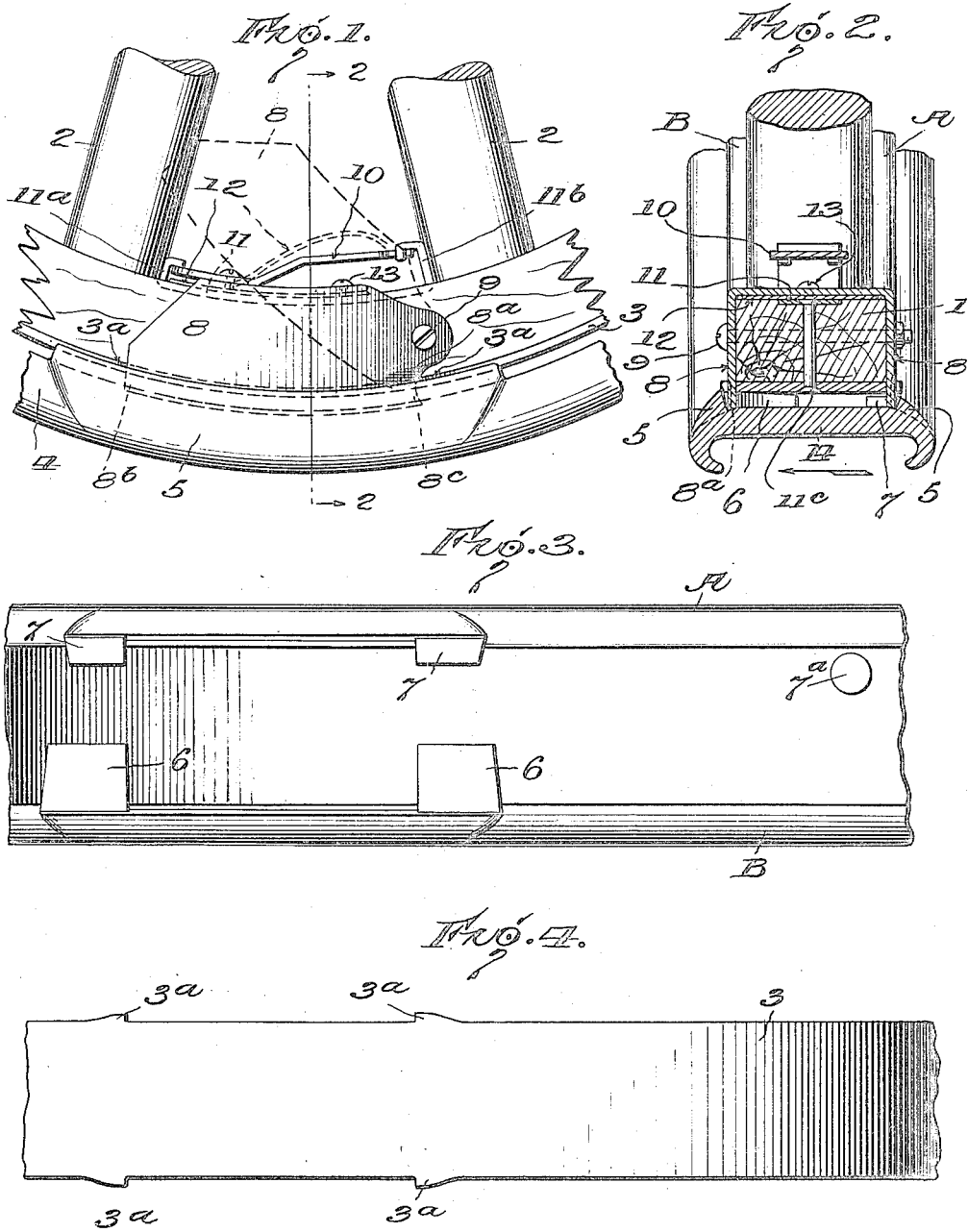

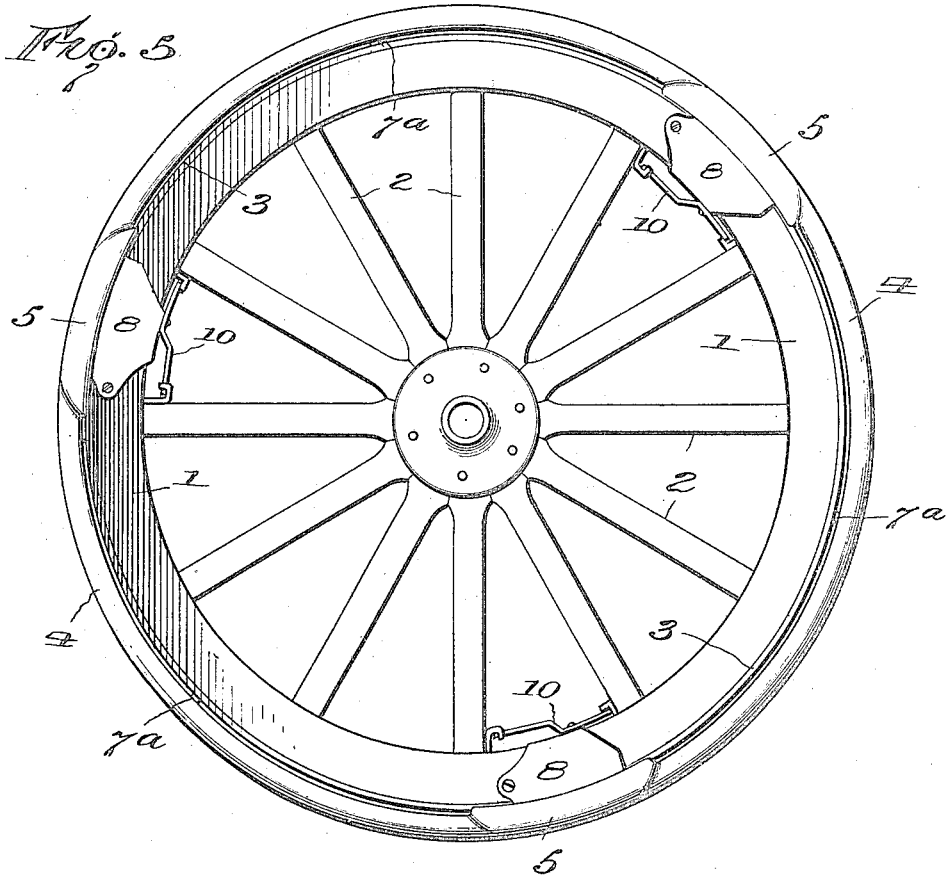
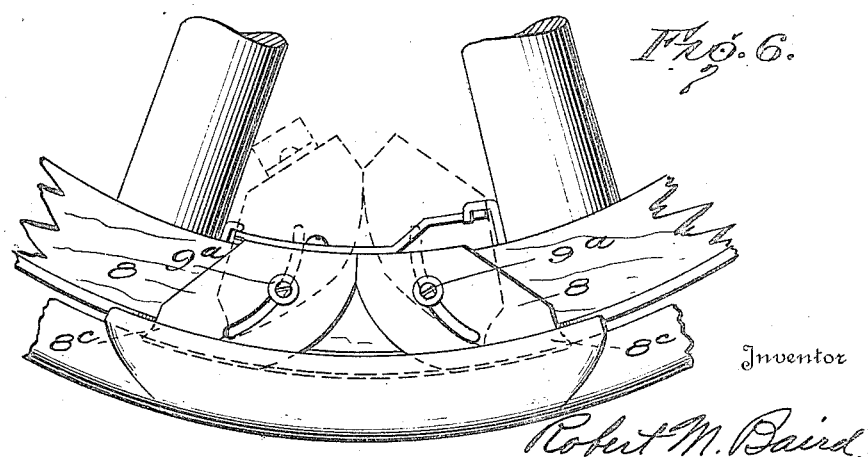

ROBERT M. BAIRD, OF SALT LAKE CITY, UTAH, ASSIGNOR OF ONE-THIRD TO BRUCE E. BAIRD AND ONE-THIRD TO W. ECCLES BAIRD, BOTH OF SALT LAKE CITY, UTAH.

DEMOUNTABLE RIM.

1,253,119.　　　　　Specification of Letters Patent.　　Patented Jan. 8, 1918.

Application filed November 29, 1916.　Serial No. 134,115.

*To all whom it may concern:*

Be it known that I, ROBERT M. BAIRD, a citizen of the United States, residing at Salt Lake City, in the county of Salt Lake and State of Utah, have invented new and useful Improvements in Demountable Rims, of which the following is a specification.

This invention relates to vehicle wheel rims and pertains particularly to demountable rims for motor cars and the fastening devices therefor.

One object of the invention is to provide a demountable rim which may be quickly and easily removed from or attached to the vehicle wheel by the manipulation of a comparatively small number of fastening devices.

Another object of the invention is to provide a simple fastening device which may be attached to any motor car wheel and which will inherently prevent axial or circumferential movement of the rim on the wheel felly.

Other details and features of the invention will be described and claimed in the annexed specification and claims and illustrated in the accompanying drawings in which—

Figure 1 shows a section of a vehicle wheel illustrating the position of the rim on the wheel felly and the combination of the locking mechanism engaging the blocks on the rim;

Fig. 2 represents a sectional view taken on line 2—2 of Fig. 1;

Fig. 3 represents a view of the inside of the rim looking at the lock blocks and the rim spacing block members;

Fig. 4 represents a view of the felly rim illustrating the position of the projectings on the felly band;

Fig. 5 represents a side elevation of the wheel and rim illustrating the locking device engaging the rim;

Fig. 6 illustrates a modification of the locking device in which the movable locking member is formed of two individual pivoted parts in which the pivot member operates in a slot.

Like numerals refer to like parts throughout the various figures.

1 represents the felly of a wheel having spokes 2, and a circumferential band 3 tightly inclosing the felly. 4 represents the usual commercial demountable rim adapted to be slipped on and off of the felly 1 and retained in position by suitable fastening means. Fastened to the rim 4 and adjacent the lateral edges thereof are a plurality of lock block members 5 arranged in pairs axially opposite each other and substantially at each side of the felly 1. These blocks 5 may be attached rigidly to the rim 4 in any manner suitable but preferably they are welded so as to provide a gradual curve from the contour of the rim 4 to the side of the block 5 and also for absolute rigidity with respect to the rim. A represents the side of the rim first to be applied, that is the inner side, and B represents the outer side of the rim. On the outer side B of the rim and at the ends of the block members 5 are rim spacing block members 6, preferably formed as an extension of the block 5, which project inwardly and engage both the rim 4 and the felly band 3. When the rim 4 is slipped over the felly 1 and the felly band 3 the rim spacing blocks 6 engage the felly band to limit the movement of the rim, space the rim concentrically with respect to the felly band and to provide a tight fit. On the lock blocks 5 on the inner side of the rim A and located opposite the rim spacing blocks 6 are a like number of projections 7 likewise formed as a part of the block 5, which assist in spacing the rim on the wheel felly. These projections 7 are shorter radially than the spacing blocks 6 and do not interfere with the taking on or off of the rim from the wheel. Additional spacing blocks 7$^a$, secured to the felly or rim, may be located at suitable intervals about the rim according to the size of the latter and the use for which the rim was designed. In addition to the spacing blocks 6 for limiting the movement of the rim on the wheel axially, the blocks 5 on the outer side B of the rim are constructed to be thicker radially than the blocks on the A or inner side of the rim 4 whereby the outer side of the felly 1 or felly band 3 is engaged by the lock block members 5 on the outer side of the wheel as the rim is applied and effectively prevents the rim from being slipped over too far. This spacing action of the rim spacing blocks 6 and blocks 5 also provides for the reception of the locking member and the true engagement of the same with the lock blocks, as will be further described.

Referring in detail to the construction of the locking member 8 it will be observed that this member is substantially U-shaped in cross section, the parallel arms extending along the outside of the felly 1 and closely embracing the same. The member 8 is pivotally mounted on the felly by means of a bolt or hinge member 9. Either side or arm of the member 8 is formed after the manner of a plate having a curve corresponding to the arc of the wheel or rim. In the open position, as in dotted lines in Fig. 1, the member 8 lies clear of the rim 4 and between the spokes when withdrawn to its full extent. In the closed position, the member 8 embraces the felly and the arms engage the inner wall of the lock blocks 5. These arms are held in a rigid position between the lock blocks and the felly on either side of the felly and rim and thus effectively prevent axial movement of the rim on the felly. The closing action of the member 8 into engagement with the lock blocks tends to slightly force the extreme lower edges of the member 8 together and the initial movement of the member 8 into engagement with the blocks 5 is facilitated by the contour of the part 8 which has at its lowermost corner a cutaway or slightly curved surface indicated by 8$^a$. Circumferential movement of the rim on the felly is prevented by the tight fitting engagement between the ends of the member 8 and the ends of the blocks 5 as indicated at 8$^b$ and 8$^c$. To prevent circumferential thrust from loosening the mounting of the member 8 and causing the pivot bolt 9 from wearing a hole in the felly, the felly band 3 is provided with axially extending lugs 3$^a$ which closely embrace the ends of the parallel arms of the member 8 when in a closed position and receive the thrust instead of the member 9.

The part 8 is provided with a positive fastening mechanism for holding the member 8 in the closed position and for effectively preventing movement or unfastening of the part 8 and any rattle or noise such as is often found in fastening devices for demountable rims. This fastening mechanism includes a pivotally mounted spring member 10 fastened to the upper side of the U-shaped member 8 and extending the length thereof. Retaining means for holding the spring 10 in the locked position is provided by metal member 11 which extends underneath the member 8, the length thereof and preferably is countersunk into the felly 1. Opposite ends of the member 11 are recurved and act as retaining means for the spring 10. When the member is in the closed position the member 10 is fitted under the recurved end member 11$^a$ of the member 11 and swung into position parallel to the movement of the member 8. The opposite end of the member 10 is then depressed and engaged with the latching end 11$^b$ and firmly held in place. The member 11 is held fixed against any loosening movement by a rivet 11$^c$ which extends through the felly 1 and felly band 3 and is riveted to the latter and the member 11 (Fig. 2).

In order that the locking member 8 may be held in the open position, to facilitate ready removal of the rim from the wheel there is provided a spring member 12 which lies between the member 8 and the top of the felly. This spring 12 is fastened to the underside of the member 8 by suitable fastening means 13 and is compressed by the member 8 when the latter is in the fastened or operative position. When the part 8 is in the released position the spring 12 assumes the position noted in dotted lines in Fig. 1. If it be desired adjacent locking members may be pivoted to move in opposite directions in order that the end 8$^c$ of the lock members, first to engage the block 5 in the closing movement, may exert a tightening action in opposite directions on the rim (Fig. 5).

Referring in detail to the modification shown in Fig. 6 it will be noted that the U-shaped member 8 is provided in two parts and arranged to slip into engagement with the lock block members from opposite directions, each side of the part 8 being provided with individual and distinct mountings and as shown herewith having a slotted engagement with a member 9$^a$ carried by the felly. Suitable fastening means may be provided for this modification as is shown in Figs. 1, 2 and 5. By having a plurality of oppositely swinging members 8 it is possible to obtain unusually rigid connections for avoiding circumferential thrust of the rim against the locking members. The sharp angle illustrated at 8$^c$ in Fig. 1 may be duplicated at the respective ends in this modification.

Changes in proportion, material and location of the parts may be made without departing from the scope of this invention.

What I claim is:—

1. In combination, a wheel felly, a demountable rim thereon, rim securing means comprising two lock block members on said demountable rim arranged axially opposite each other at the sides of said felly, and a locking member mounted on said felly and extending axially across the same and adapted to be engaged between the felly and the lock block on each side of said felly whereby axial movement of the rim on the felly is prevented.

2. In combination, a wheel felly, a demountable rim thereon, rim securing means comprising two lock block members on said demountable rim arranged axially opposite each other at the sides of said felly, and a locking member mounted on said felly and extending axially across the same and adapted to have a wedging engagement between the felly and the lock block on each side of said felly, whereby axial movement of the rim on the felly is prevented.

3. In combination, a wheel felly, a demountable rim thereon, rim securing means comprising two lock block members on said demountable rim arranged axially opposite each other at the sides of said felly, and a substantially U-shaped locking member mounted on the felly and straddling the same and having parallel arms adapted to have a wedging engagement between the felly and the lock block on each side of said rim, whereby axial movement of the rim on the felly is prevented.

4. In combination, a wheel felly, a demountable rim thereon, rim securing means comprising two lock block members on said rim arranged axially opposite each other, one on each side of said felly, and a locking member mounted on said felly and adapted to be engaged between the felly and the lock block on each side of said rim whereby axial movement of the rim on the felly is prevented, the lock block on one side of the rim extending centrally and axially adjacent the ends thereof to provide a cam surface between said rim and said felly whereby said block and cam surface engages the felly and limits the movement of said rim in one direction axially of said felly.

5. In combination, a wheel felly, a felly band on said wheel felly, a demountable rim thereon, rim securing means comprising two lock block members on said rim arranged axially opposite each other at the sides of said felly, a locking member mounted on said felly and adapted to be engaged between the felly on each side thereof and the lock block on each side of said rim, whereby axial movement of the rim on the felly is prevented, and rim spacing members adjacent the ends of the said block members on one side of the rim and rigid with respect thereto and located between the rim and said felly, whereby axial movement of the rim in one direction is checked by the engagement of the said rim spacing members against the felly band.

6. In combination, a wheel felly, a demountable rim thereon, rim securing means comprising two lock block members on said rim arranged axially opposite each other at the sides of said felly, a substantially U-shaped locking member mounted on the felly and having parallel arms straddling the same and adapted to have a wedging engagement between the felly and the lock block on each side of said rim whereby axial movement of the rim on said felly is prevented, and a projecting shoulder at each end of said lock block members arranged to receive the parallel arms between the same whereby circumferential movement of the rim on the felly is prevented.

7. In combination, a wheel felly, a metal felly band thereon, a demountable rim on said felly, rim securing means comprising two lock block members on said rim arranged axially opposite each other at each side of said felly, a substantially U-shaped locking member mounted on the felly and having parallel arms straddling the same and adapted to have a wedging engagement between the felly and the lock blocks on each side of said rim whereby axial and circumferential movement of the rim on the felly is prevented, and lug members on said felly band projecting axially at each side of said locking member whereby said locking member is braced against circumferential thrust of the rim against the locking member.

8. In combination, a wheel felly, a demountable rim thereon, rim securing means comprising two lock block members on said rim arranged axially opposite each other at the sides of said felly, a substantially U-shaped locking member pivotally mounted on said felly and having parallel arms straddling the same and engaging said lock blocks whereby axial and circumferential movement of said rim on said felly is prevented, and a fastening mechanism for holding said locking member in the operative position comprising a pivotally mounted spring member on said locking member and a double receiving member for said spring member fastened to the felly, extending along the same and beneath the locking member and having a recurved portion at each end thereof to receive the opposite ends of said spring member.

9. In combination, a wheel felly, spokes for said felly, a demountable rim on said felly, rim securing means comprising lock block members on said demountable rim arranged axially opposite each other at the sides of said felly, and a pair of substantially U-shaped locking members between adjacent spokes pivotally mounted on said felly and having parallel arms straddling the same and adapted to have a wedging engagement between the felly and the lock block on each side of said rim, whereby axial and circumferential movement of said rim on said felly is prevented.

10. A demountable rim for vehicle wheels having a plurality of lock block members arranged in pairs on the inner side of said rim and axially opposite each other, said block members having an inner shoulder in a plane parallel to the plane of the rim and an outer curved surface to conform with the contour of the curved edge of the rim.

In testimony whereof I affix my signature in presence of two witnesses.

ROBERT M. BAIRD.

Witnesses:
 HARRY S. HARPER,
 B. HOLLINGS.

Copies of this patent may be obtained for five cents each, by addressing the "Commissioner of Patents, Washington, D. C."